United States Patent [19]
Mattes

[11] 3,815,930
[45] June 11, 1974

[54] COLLET

[76] Inventor: Lorenz Mattes, D 7201-Konigsheim, Bundesrepublik, Germany

[22] Filed: Dec. 6, 1972

[21] Appl. No.: 312,494

[52] U.S. Cl.................................. 279/50, 279/1 Q
[51] Int. Cl............................................. B23b 31/20
[58] Field of Search....................... 279/1 Q, 47–54

[56] References Cited
UNITED STATES PATENTS
3,669,462   6/1972   Parsons............................. 279/1 Q Primary Examiner—Francis S. Husar
Attorney, Agent, or Firm—Eric H. Waters

[57] ABSTRACT

A collet for the spindle of an automatic lathe or the like, including a plurality of clamping jaws having a least portions thereof supported by and embedded in an elastic member. The elastic member has slots formed therein intermediate adjacent pairs of the clamping jaws so as to provide spring-like biasing action improving the degree of elasticity of the clamping jaws.

7 Claims, 3 Drawing Figures

PATENTED JUN 11 1974 3,815,930

COLLET

FIELD OF THE INVENTION

The present invention relates to a collet for retaining work pieces in the spindle of an automatic lathe or the like. More particularly, the invention relates to a collet having clamping jaws provided with external conical portions which are embedded in an elastic member, and which is encompassed by a compression sleeve having an internal conical portion.

DISCUSSION OF THE PRIOR ART

Presently used collets generally include three clamping jaws which, in radial cross-section, have approximately the form of an annular ring-sector, and whose collective outer surfaces lie on a common conical surface. The compression sleeve which encompasses the clamping jaws is provided with a complementary conical surface or an inner cone to impart a clamping action on the clamping jaws by means of axial sliding movement of the compression sleeve. Each clamping jaw is seated on a so-called "spring" formed of an elastic material, and the collective springs are in turn connected to a rearwardly positioned collar so as to elastically bias the clamping jaws in a radially outwardly extending direction. The compression sleeve itself is displaceable or slidable in an axial direction within a hollow spindle of the automatic lathe or a similarly operating machine. A suitable coupling nut is threaded onto the forward end of the spindle, and is formed with a suitable recess in the region of the clamping jaws. In order to allow for the opening of the collet, the compression sleeve is released, whereby the spring-loaded clamping jaws are adapted to slide the compression sleeve rearwardly by means of their conical outer surfaces. The opening of the collet is thus effected, on the one hand, through the biasing action of the springs and, on the other hand, in response to the centrifugal force acting on the clamping jaws. Predicated on past experience, the springs, which are usually located between the rearwardly positioned collar and the clamping jaws, should preferably be elastic, since otherwise because of the high surface pressure which are exerted against the conical surfaces thereof, automatic opening of the collet cannot be positively assured. In order to obtain a greater degree of elasticity of the springs, the latter are formed as relatively thin-walled members and are partially thinned out or bevelled. The dimensions of the springs have, however, a lower practical limit, since the collet must possess a predetermined shear resistance or strength in the vicinity of the springs.

It is also known that the cone of the compression sleeve should be dimensioned so as to contact only a relatively small segment of the cooperative conical surfaces of the clamping jaws. However, a drawback of this construction lies in that in view of the relatively small contacting surfaces, it is extremely difficult to achieve precise centering. In view of the foregoing, such clamping jaws must be supported, together with their rearwardly positioned mounting collars, and then centered. This requires that the collar and the cone surfaces be precisely finished or polished, so as to be concentrically positioned relative to each other and to the center axis of the collet. This, of course, increases the manufacturing costs of the collect by an appreciable amount.

Further, there are also known collets having relatively small clamping jaws, each with parallel side surfaces extending with respect to the central aperture thereof, which are mounted or embedded in a through-extending elastic rubber member. The outer surfaces of the clamping jaws thereby similarly lie on a common conical surface. In these prior art collets the extremely small outer surfaces of the clamping jaws within a short time work themselves into the conical surface of the compression sleeve. Additionally, such clamping jaws can never be precisely centered within the compression sleeve, since the conical surface of the pressure sleeve does not contact the individual clamping jaws along the full lengths thereof. The foregoing, not feasible in the prior art collets, since otherwise the degree of friction between the clamping jaws and the compression sleeve becomes excessively large, and the clamping jaws upon sliding of the compression sleeve cannot be automatically released therefrom. Additionally, the utilization of these collets, which generally have larger diameters is not practical.

SUMMARY OF THE INVENTION

Accordingly, it is an object of the present invention to provide a collet of the type described which may be economically manufactured, which evidences an increased elasticity upon opening, while concurrently providing for the satisfactory guiding and support of the workpieces positioned in the automatic lathe or similarly operating machine.

The foregoing is inventively achieved by imparting a construction to the side surfaces of each of the clamping jaws, in a manner known, so as to encompass an angle differing from zero, and providing between each pair of clamping jaws a novel and unique elastic member having a slot extending in an axial direction.

In the inventive collet, the clamping jaws including the contiguous intermediate portions of the elastic member having the slotted portion, have essentially the general configuration of known collets which are formed solely of steel clamping jaws, the latter of which are usually individually supported on elastic springs. By embedding the clamping jaws in the elastic member, the degree of elasticity of the so-called springs is considerably increased, in view of which it has become evident that the inventive collet may be readily released from the compression sleeve even at extremely high rotating speeds, in effect, when subjected to high centrifugal forces, which is not possible when utilizing prior art steel collets. Furthermore, the clamping jaws of the collet may be contacted along their entire collective surface lengths and widths by the inner conical surface of the compression sleeve. This provides for improved centering action on the work piece by the collet so as to obviate the need of a rear support collar for the clamping jaws.

The elastic member is suitably formed of a plastic material which, on the one hand, reduces the manufacturing costs thereof and, on the other hand, provides for the obtention of the desired degree of elasticity through appropriate selection of the plastic material.

The slots which are provided intermediate the individual clamping jaws in the elastic member, preferably extend further back in the elastic member than the dimensions of the clamping jaws. In view of the foregoing, the individual clamping jaws are again supported on "springs," which are formed intermediate the individual slots. At the rearmost end, the slots, in an advantageous embodiment thereof, extend into a thin-walled cylindrical annular section of the elastic member. Consequently, that construction imparts on the one hand, a superior degree of elasticity to the collet and, on the other hand, satisfactory centering to the work pieces in the machine.

In accordance with a further embodiment of the invention, the outer surfaces of the portions of the elastic members are contiguous to the clamping jaws, in effect, the side as well as the rearwardly contacting portions, and collectively in the outer cone surfaces of the clamping jaws. This will provide for an improvement in the centering action of the collet, whereas steel clamping jaws only are subjected to pressure by the conical surfaces of the compression sleeve.

In a preferred embodiment of the inventive collet there is provided, as is generally known, three clamping jaws which, together with the portions of the elastic member contacting the sides thereof, each extend over approximately 120°, in view of which, similar to a collet formed completely of steel, only small slots are provided between the adjacent portions of the clamping jaws.

Since the release of the compression sleeve from the clamping jaws is provided for in any event by the improved elasticity of the collet, the contacting surfaces between the outer cone surfaces of the clamping jaws and the cooperative inner cone surface of the compression sleeve may be made as large as possible. This is inventively achieved in that the outer cone of the clamping jaws and the inner cone of the pressure sleeves are shaped so as to be completely complementary to each other. This permits the obtaining of a considerably improved centering action in comparison with prior art collets, in the latter of which only a small annular segment of the conical surface thereof may be contacted by the sleeve in their cooperative positions.

In order to assure the correct positioning of the clamping jaws in the elastic member, a further advantageous aspect of the invention lies in providing, at the forward end of the clamping jaws, peripherally extending grooves into which the elastic member extends.

The inherently good centering action of the collet may be still further improved, in another advantageous aspect of the invention, by providing a guide aperture in the rearward end of the elastic member, having a cross-section which corresponds to the dimensions of the workpiece. In this manner the collet is additionally centered by means of the clamped workpiece, which is in the form of rod material.

The inventive collet distinguishes itself in comparison with the presently known collets in particular through reduced manufacturing and finishing costs, and the considerably improved "spring" or resilient, elastic properties thereof.

BRIEF DESCRIPTION OF THE DRAWINGS

Reference may now be had to the following detailed description of an improved embodiment of a collet according to the invention, taken in conjunction with the accompanying drawings, in which.

DETAILED DESCRIPTION

Figure 2:
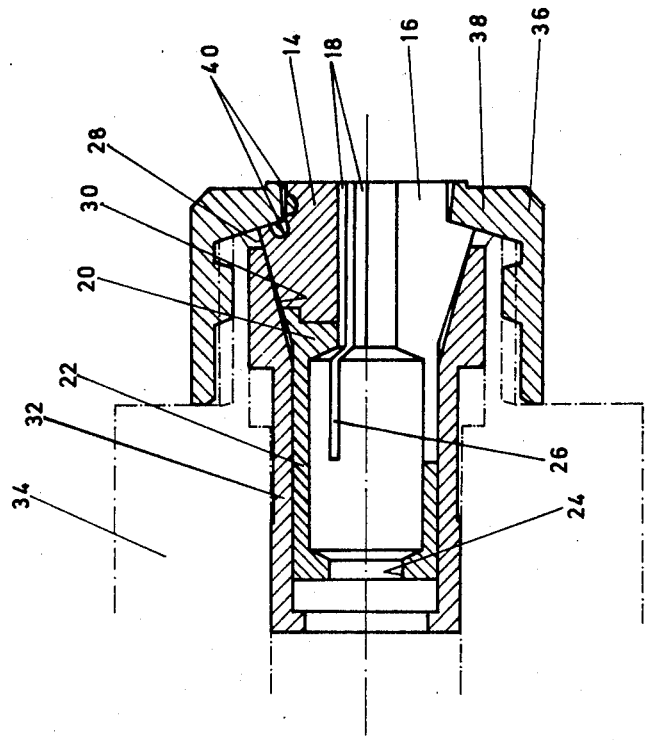
FIG. 2 is a sectional view along line 2—2 in FIG. 1.
Figure 1:
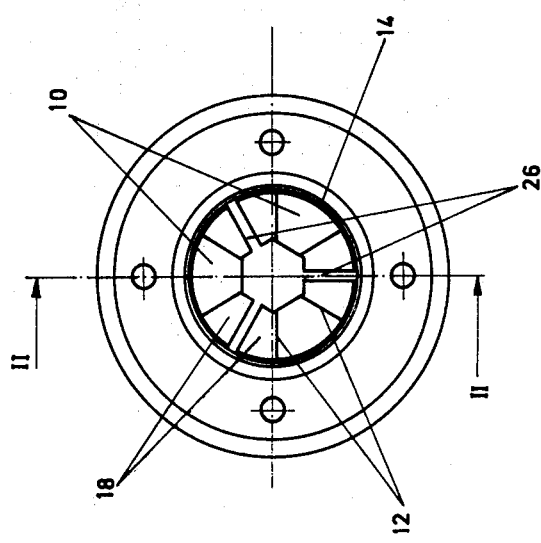
FIG. 1 is a front end view, in an axial direction, of a collet in accordance with the present invention.
Figure 3:
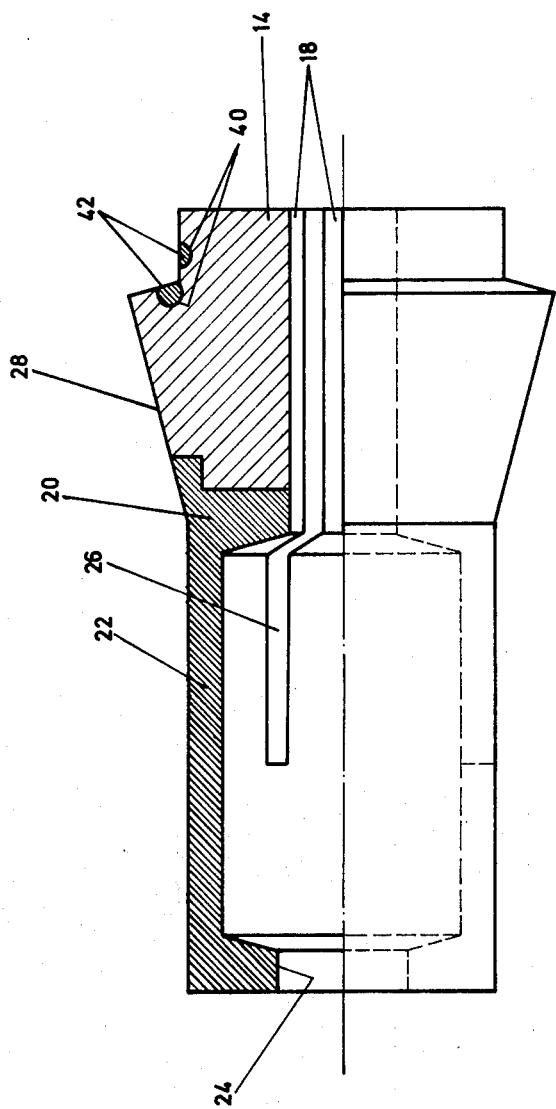
FIG. 3 is an enlarged detail of a portion of FIG. 2, of which one-half is shown in section.

Referring now in detail to the drawings, the illustrated embodiment of the inventive collets shows three steel clamping jaws 10, each having side surfaces 12 which encompass an angle differing from zero. Consequently, the clamping jaws are imparted with relatively large conical outer surface portions 14.

The clamping jaws 10 are embedded in an elastic plastic material member 16, the latter of which includes side portions 18 and a rearwardly extending portion 20, the latter of which extends at its rearmost end into a thin-walled annular ring 22. At the rearmost end of the cylindrical ring portion 22 there is formed a guide bore 24, which in cross-section corresponds to the cross-section of the rod material being worked in the machine.

Between the side portions 18 of the elastic member 16, there are formed small axial slots 26 which extend rearwardly into the region of the annular ring section 22. The portions of the cylinder ring section 22 lying within the extent of the slots 26 are thereby adapted to operate in conjunction therewith, with the rearward portion 20 and the side portion 18 of the elastic member, so as to provide outwardly acting so-called "spring."

The outer surfaces 14 of the clamping jaws 10, and the side portions 18 of the elastic member 16, collectively lie within an outer cone 28 which corresponds to the inner conical surface 30 of a compression sleeve 32 which extends about the clamping jaws 10 and the elastic body 16. The compression sleeve 32 is, as represented schematically by the chain dotted lines, axially adjustably slidably positioned within a bore in a spindle 34. A coupling nut 36 is threadingly engaged on the forward end of the spindle 34, and is adapted to come into biasing contact with assembling portions 38 on the leading end surfaces of the clamping jaws 10.

In order to anchor the clamping jaws 10 in the elastic body 16, the clamping jaws are provided at their forward or leading ends with annularly shaped grooves 40 into which project small annular projections 42 on the elastic member, and which are integrally formed with the contiguous side portions 18 of the elastic member.

While there has been shown what is considered to be the preferred embodiment of the invention, it will be obvious that modifications may be made which come within the scope of the disclosure of the specification.

I claim:

1. A collet for supporting work pieces in the spindle of an automatic lathe or the like, said collect comprising:

a plurality of discrete clamping jaws defining collectively an external conical periphery and being embedded in an elastic plastic material member, said clamping jaws each having sidewall portions extending so as to subtend an angle differing from 0°, said plastic material member forming a supporting member for said clamping jaws of generally low compressibility, axially extending slots being provided in said supporting member intermediate each of said discrete clamping jaws and forming individual plastic material spring means, said slots extending rearwardly beyond said clamping jaws in said plastic material member, said plastic material member having a guide sleeve segment extending rearwardly from said conical collet periphery.

2. A collet as claimed in claim 1, said guide sleeve segment being integrally formed with said plastic material support member and extending axially rearwardly of said clamping jaws, at least a portion of said segment having a thin-walled, annular ring-shaped configuration.

3. A collet as claimed in claim 1, said plastic material support member having outer surface portions contiguous to the sides of said clamping jaws, said outer surfaces being flush with the outer conical surfaces of said clamping jaws.

4. A collet as claimed in claim 1, said collet comprising three of said clamping jaws.

5. A collet as claimed in claim 1, comprising a compression sleeve encompassing said collet, said compression sleeve having an internal conical periphery conforming to the external conical periphery of said clamping jaws.

6. A collet as claimed in claim 1, comprising annular groove means formed in the leading end surfaces of said clamping jaws, said elastic plastic material member having portions extending into said groove means.

7. A collet as claimed in claim 1, comprising a central aperture formed in the trailing end of said elastic plastic material member, said aperture being dimensioned to correspond to the cross-section of a work piece adapted to be mounted in said collet.

* * * * *